(12) United States Patent
Guenther

(10) Patent No.: US 6,477,511 B1
(45) Date of Patent: Nov. 5, 2002

(54) METHOD AND POSTAL APPARATUS WITH A CHIP CARD WRITE/READ UNIT FOR RELOADING CHANGE DATA BY CHIP CARD

(75) Inventor: Stephan Guenther, Berlin (DE)

(73) Assignee: Francotyp-Postalia AG & Co., Birkenwerder (DE)

(*) Notice: Subject to any disclaimer, the term of this patent is extended or adjusted under 35 U.S.C. 154(b) by 0 days.

(21) Appl. No.: 09/211,340

(22) Filed: Dec. 15, 1998

(30) Foreign Application Priority Data

Dec. 15, 1997 (DE) .......................... 197 57 653

(51) Int. Cl.⁷ ............................................. G06F 17/60
(52) U.S. Cl. ............................ 705/60; 705/61; 705/62; 705/401; 705/410
(58) Field of Search .................. 705/60, 61, 401, 705/403, 409, 410; 235/375, 380, 382

(56) References Cited

U.S. PATENT DOCUMENTS

| | | | |
|---|---|---|---|
| 4,746,234 A | 5/1988 | Harry .................... 400/120.01 |
| 4,802,218 A | 1/1989 | Wright et al. ................. 705/60 |
| 5,111,030 A * | 5/1992 | Brasington et al. ......... 235/375 |
| 5,490,077 A | 2/1996 | Freytag ..................... 705/405 |
| 5,602,743 A * | 2/1997 | Freytag ..................... 705/408 |
| 5,606,508 A | 2/1997 | Thiel ......................... 705/410 |
| 5,655,023 A * | 8/1997 | Cordery et al. ............. 705/401 |
| 5,710,706 A | 1/1998 | Märkl et al. ................ 705/409 |
| 5,805,711 A | 9/1998 | Windel et al. .............. 705/401 |
| 5,884,292 A * | 3/1999 | Baker et al. ................ 705/403 |
| 5,905,232 A * | 5/1999 | Schwartz et al. ........... 705/409 |
| 6,041,704 A * | 3/2000 | Pauschinger ................ 705/401 |
| 6,085,180 A * | 7/2000 | Beer et al. .................. 705/401 |
| 6,111,951 A * | 8/2000 | Guenther ..................... 705/60 |
| 6,199,752 B1 * | 3/2001 | Bornemann et al. ........ 705/401 |

FOREIGN PATENT DOCUMENTS

| | | |
|---|---|---|
| DE | OS 195 34 530 | 3/1997 |
| DE | OS 196 05 015 | 3/1997 |
| GB | 2185443 A * | 7/1987 |
| WO | WO-97/40602 * | 10/1997 |

OTHER PUBLICATIONS

Anonymous, "New Postal Imprinting to Affect Soho", Managing Office Technology, vol. 42, No. 6, Jun. 13, 1997.*

* cited by examiner

Primary Examiner—James P. Trammell
Assistant Examiner—John W. Hayes
(74) Attorney, Agent, or Firm—Schiff Hardin & Waite

(57) ABSTRACT

A postal apparatus, particularly a postage meter machine, has a chip card write/read unit for reloading fee schedule change data by chip card. In combination. with a first-time insertion of the chip card, an appertaining controller of the postage meter machine allows a first reloading and—as a result thereof—a writing of data into the chip card. The use data in the chip card are thereby modified in a predetermined way, so that, given a repeated data loading, the chip card supplies usable data only in the same postage meter machine. The use data are stored in a first memory area of the chip card and include the remaining use data and variable data, or a crypto code following the initial use. A protective code, formed after the. initial use for the authorization of the use data is stored in a second memory area of the chip card.

9 Claims, 5 Drawing Sheets

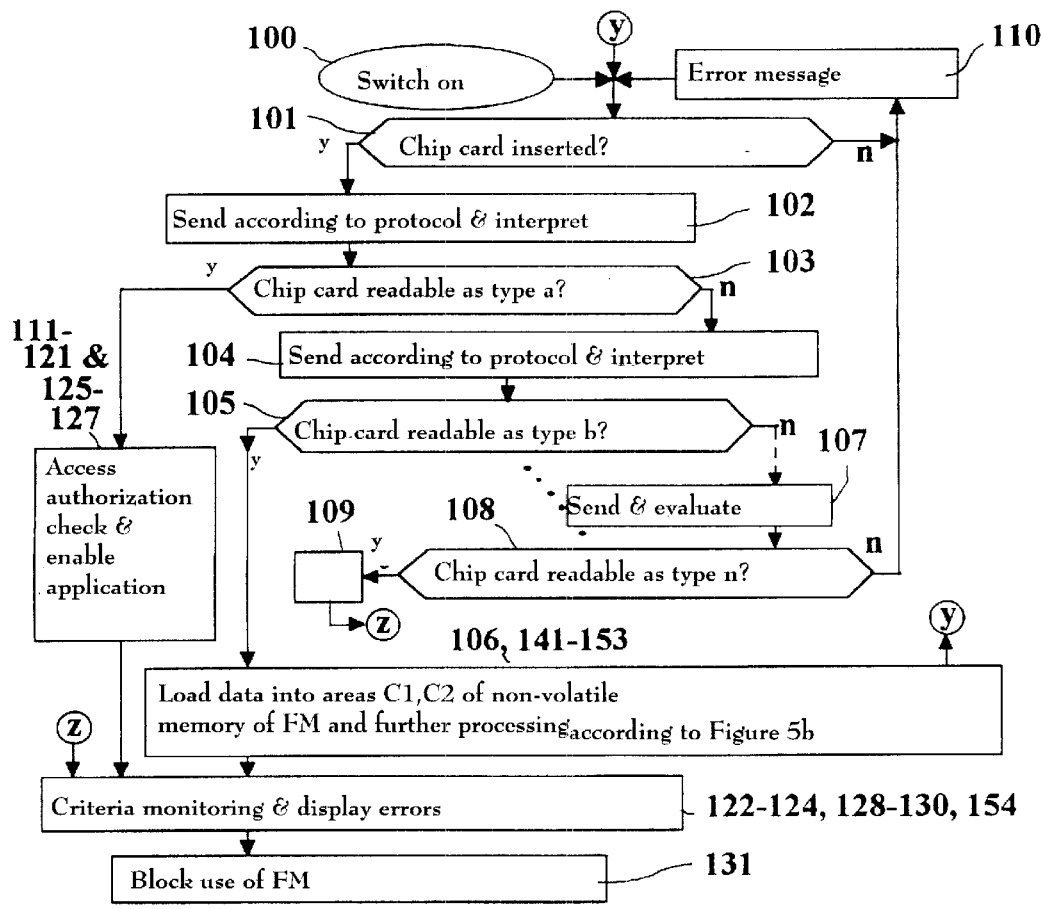

METHOD AND POSTAL APPARATUS WITH A CHIP CARD WRITE/READ UNIT FOR RELOADING CHANGE DATA BY CHIP CARD

BACKGROUND OF THE INVENTION

1. Field of the Invention

The present invention is directed to a method and to a postal apparatus, particularly a postage meter machine, of the type having a chip card write/read unit for reloading change data by chip card into the postage meter machine or into a postal scale.

2. Description of the Prior Art

The reloading of postage fee tables into a postage meter machine by chip card via a chip card write/read unit is already disclosed in U.S. Pat. No. 5,606,508 for postage meter machines and in U.S. Pat. No. 5,710,706 for scales. The control unit of the postage meter machine performs a monitoring function with respect to the conditions for data updating and controls the reloading.

Modern postage meter machines such as, for example, the thermal transfer postage meter machine disclosed by U.S. Pat. No. 4,746,234 utilize fully electronic digital printer devices. It is thus fundamentally possible to print arbitrary texts and special characters in the postage stamp printing area and to print an arbitrary advertizing slogan or one allocated to a cost center. For example, the postage meter machine T1000 of Francotyp-Postalia AG & Co. (Postalia, Inc. in the U.S.) has a microprocessor that is surrounded by a secured housing having an opening for the delivery of a letter. Given delivery of a letter, a mechanical letter sensor (microswitch) communicates a print request signal to the microprocessor. The franking imprint contains a previously entered and stored postal information for dispatching the letter.

It is also known to store data specific to cost centers on chip cards in order to make the user-specific information mobile (portable) and to avoid an intentional misuse of other cost centers. U.S. Pat. Nos. 5,606,508 (corresponding to German OS 42 13 278) and 5,490,077 disclose a data entry with chip cards for the aforementioned thermal transfer postage meter machine. One of the chip cards loads new data into the. postage meter machine, and a set of further chip cards allows a setting of correspondingly stored data to be undertaken by plugging in a chip card. Loading data and setting the postage meter machine are thus possible in an easier and faster manner than via a keyboard input. The keyboard of the postage meter machine remains small and surveyable because no additional keys are required in order to load or set additional functions. A plug-in slot of a chip card write/read unit, in which the respective chip card is to be plugged by the customer within a time window, is located on the back side of the postage meter machine. Due to the lack of direct visual contact, an unpracticed user often does not always succeed in inserting the required chip cards in immediate succession, which then leads to unwanted delays. The plug-in slot of a chip card write/read unit is only easily accessible when the user bends over the machine. The problems in producing visual contact increase given larger machines. The user often has a number of other chip cards that can be plugged in. One chip card type (size format), for example telephone cards, credit cards and the like, can be physically inserted into the postage meter machine but will not be accepted. Without visual contact, however, the error is not always immediately obvious. The postage meter machine only works with relatively expensive chip cards that are themselves equipped with a microprocessor (smart card) and are thus able to check whether the postage meter machine communicates a valid data word to the chip card before an answer is sent to the postage meter machine. When, however, no answer or user identification ensues, this is registered as an error in the postage meter machine and is displayed before a request to remove the chip card is displayed in the display. To register an erroneously inserted telephone card as attempted fraud, however, would not be reasonable given the not unlikely occurrence of an "innocent" mistake.

A modified technique for scales is disclosed in the aforementioned U.S. Pat. No. 5,710,706. The chip card write/read unit of this postage meter machine is employed fro the additional purpose loading new postage fee tables into the corresponding non-volatile memories of the scale. The different fee schedule structure and fee schedules of further mail carriers also can be loaded. Since the available memory capacity on a chip card is limited, all required data are sequentially loaded into the scale via the postage meter machine with a series of chip cards which are successively inserted.

As an alternate way for solving the further problem that there is only limited memory capacity available on a chip card, U.S. Pat. No. 4,802,218 discloses that a number of chip cards be simultaneously employed, these being plugged into a number of write/read units. In addition to a user chip card for the recrediting and debiting whereby the postage fee value is subtracted from the credit, a master card and a further rate chip card with a stored postage fee table are simultaneously plugged in. By accessing a postage fee table, a postage fee value can be determined according to the input weight and shipping destination without loading an entire table into the machine. Since, however, a respective write/read unit is required for every chip card, the apparatus becomes too large and expensive. Moreover, a separate reloading terminal is required in order to replenish the credit in the user chip card, with the master card providing the authorization for this reloading function. A supervisor card has access to all master cards. Various security levels are accessible by appertaining key codes. Such a system with a number of slots for chip cards is very complex overall.

German OS 196 05 015 discloses an embodiment for a printer device (JetMail®) that, given a non-horizontal, approximately vertical letter transport, implements a franking imprint with an ink jet print head stationarily arranged in a recess behind a guide plate. For recognizing the start (leading edge) of a letter, a print sensor is arranged shortly before the recess for the ink jet print head and collaborates with an incremental sensor. The letter transport is free of slippage due to pressure elements arranged on the conveyor belt, and the incremental sensor signal derived during the transport has a positive influence on the quality of the print image. Given such a postage meter machine exhibiting larger dimensions, however, a chip card write/read unit would have to be arranged and operated such that sequentially pluggable chip cards can be unproblematically used.

The chip cards are usually initialized by the chip card manufacturer and the postage meter machine manufacturer, however, it is complicated for the postage meter machine manufacturer to take specific customer wishes into consideration. Although information with respect to the postage fees matched to the current fee schedules must be communicated to the individual user of a postage meter machine, it affects all users of postage meter machines. A non-personalized chip card would have the advantage of being able to be produced on a mass production basis which could be implemented on short notice immediately before a fee schedule change. Given a freely purchasable non-personalized reloading card, however, there is the possibility that users of postage meter machines may have received the reloading information from other users without adequately compensating the actual service vendor. A universal requirement to purchase reloading cards cannot be implemented because some users would then be required to purchase unneeded information. This would be the case, for example, when only details of the reloading information that are not relevant to all users are modified. Finally, it is also technically unnecessary to replace an entire table only because of a few modified details. Moreover, commercially available programming devices exist with which a new chip for a chip card can be burned-in. A final consideration is that a data bank with expensive data bank security would only be required to prevent a misuse, and thus may not be needed when the risk of misuse or the incentive to tamper is low.

For some specific chip card applications, there is far less of a security risk for the protection or devaluation (theft) of the monetary data present on the chip card. Thus, an estimate of the tampering potential or of the tamperer categories is fundamentally required for every application in order to achieve the desired security level with measures that are reasonable in terms of outlay. The axiom "as much as necessary, as little as possible" thereby applies. A registered. postage meter machine use number would too obviously divulge the user identifier to an attacker. A certain deterrence threshold for theft by copying must therefore be present.

Often, chip cards have only a highly limited memory capacity. This is especially true of inexpensive chip cards. Thus, memory cards are usually implemented with a few hundred bits of memory capacity. This memory capacity is insufficient for accepting the full scope of fee-specific data. There are numerous security methods based partly on access-protected physical areas of the chip cards and partly on different cryptographic protection algorithms. A disadvantage of these methods is that a high initialization outlay must be expended, for example for the individualization of the cards by assigning PINs or for code administration given cryptographic methods. Known security methods are unsuitable insofar as they require a great deal of additional memory capacity on the chip card. Deleting the data on the chip card after their one-time use in fact requires no additional memory capacity on the chip card but must still remain out of consideration because the method would preclude a repeated use of the reloading card at the same postage meter machine. A repeated use of the reloading card at the same postage meter machine is required for recovery in case of error if the appertaining data have been lost in the postage meter machine and must be restored. A repeated use of the reloading card at the same postage meter machine also can be required as needed for the purpose of pre-dating mail, particularly when a change in fee schedule takes effect in the time span between normally dated mail and pre-dated mail. In the pre-dating to a future date of mail to be carried by a selected mail carrier, mail is already franked in bulk several weeks or days before the shipment and is warehoused until the shipment date. A corresponding carrier-related chip card loads carrier-related reloading data into the postage meter machine. After the end of the one franking job, a new franking job is to be processed. To this end, another carrier-related chip card can load carrier-related reloading data into the postage meter machine. Since the postage meter machine cannot load and store all data for all carriers, a repeated use of the reloading card is required in order to implement pre-dated mail processing in alternation.

SUMMARY OF THE INVENTION

An object of the present invention is to provide a fraud-proof method and postage meter machine with a chip card write/read unit for reloading fee schedule change data into a postage meter machine or into a scale by chip card. The method and machine should allow an easily accessible chip card write/read unit and an appertaining controller to be utilized and a set of unpersonalized chip cards should be made available to the user, these allowing a reloading of information for the implementation of postage meter machine functions, or their combined application, as often as necessary. On the other hand, a protection against multiple use of one and the same chip card in other postage meter machines when the used chip card is handed over should be created.

The above object is achieved in accordance with the invention in a method and machine wherein, before the utilization of the data stored on a first chip card, a postal apparatus, particularly a postage meter machine, modifies this data with the assistance of a specific crypto-algorithm and a suitable, device-specific, first key, such that the data can only be decrypted with the assistance of this key. The use data are stored in a first memory area of the aforementioned chip card and include the remaining use data and variable data, or a crypto code after the initial use. A repeatedly used chip card only supplies usable data for the same device that implemented the personalization of the unpersonalized chip card when it was inserted for the first time.

In the case of a renewed data loading from the first chip card into the postal apparatus an additional inscription of data modified in a predetermined way in the postal apparatus into the chip card is implemented as a result of the reloading.

Additionally, given a repeated use of the first chip card, the modified data differ dependent on the number of uses, so that a renewed data loading into the postal apparatus and an additional inscription of data modified in another predetermined way in the postal apparatus ensue into the chip card. The modification only affects the form of the data and their storage in memory locations, however, it has no effect on the content of the information that can be reloaded at any time. The postal apparatus can reconstruct the original information independently of the encrypted or unencrypted form. The nature of the modification is predetermined by the stored program. A reversible encryption algorithm such as, for example, DES (Data Encryption Standard) is preferably employed.

Alternatively, data segments or at least functions derived from the data or data segments, can be modified in a predetermined way in order to then rewrite these segments or functions in a memory area as code.

The writing of a code based on initial data into the chip card, given repeated insertion thereof, can be additionally employed for the purpose of verifying the authenticity of the chip cards before the chip card data are used again internally in the postage meter machine. A code is stored in a second memory area of the chip card for the authorization of the use data, or a different code is stored after the initial use. A second key is stored in the chip card in hidden form. An identical second key is likewise stored in a manner so as to be protected against unauthorized reading in all postage meter machines. For example, the second key can be scrambled or functionally operated with the data checksum in a predetermined way, so that the key is also given a different appearance with every new fee schedule table. A third key that has a predetermined relationship to the second key exists in every postage meter machine.

This second key—similar to a recursive method—is inventively co-encoded by the third key, resulting in the execution of a check routine for authenticity in a protected (postage meter machine) device environment without having the second key leave the postage meter machine during the procedure or having its secrecy compromised. After the decoding of the data or data parts or data functions, the verification of the data authenticity now ensues internally in the device at least on the basis of the check of a predetermined relationship between the secret second key of the chip card and the third key of the postage meter machine. Additionally, the checksum formed over the unencoded chip card data can be utilized for the authenticity check in a form modified in a predetermined way with the second key. This requires an interleaved check of mutually dependent data that have a predetermined relationship to one another. After use of the chip card, the data inventively remain in a form modified by the first postage meter machine—specific key, which precludes a meaningful use of the data given an attempt to the chip card at a different postage meter machine, as well as leading to blocking of the chip card, or of the postage meter machine, when the attempt is made.

In particular, the invention creates a chip card/postage meter machine system, so that an automatic reloading of a postage meter machine can be achieved after the insertion of a reload chip card—recognizable with respect to its type—into a chip card write/read unit without having the same chip card likewise produce a reloading after being inserted into a chip card write/read unit of another postage meter machine. The crypto code is calculated in the postage meter machine and written into the chip card, so that the chip card supplies usable data only for the same postage meter machine. Also a MAC protection technique is utilized that requires little memory capacity on the chip card and nonetheless allows a machine-check of the authenticity of the chip card data.

The chip card/postage meter machine system can be arbitrarily expanded or modified. A different inserted chip card type can be recognized by the postage meter machine and correspondingly interpreted. The postage meter machine thus can be operated with an optimally inexpensive chip card type dependent on the nature of a particular application.

Arranging the chip card write/read unit behind the guide plate of the postage meter machine allows easy access thereto. The chip card can be seen well during the insertion, and the type of chip card being inserted at the moment thus also can be easily determined on the basis of a corresponding identification.

For a data update among all the postage meter machine users, a delivery of unpersonalized chip cards with identical content to the respective users can ensue as a massed-produced product, it being incumbent upon the supplier to undertake measures for the protection of the original chip cards against unallowed copying until the first reloading. A certain deterrence threshold for theft by copying is also achieved by using a specific, particularly rarer card type that is thus more difficult to acquire. Second, however, it is assured that, following the initial use of the card by a postage meter machine, this card can only be used at this specific apparatus and that a data use at other postage meter machines is no longer possible. A necessity to surrender the data content of a chip card already used once for reloading for multiple use at other postage meter machines thus is avoided.

DESCRIPTION OF THE DRAWINGS

FIG. 4a is an illustration of the data structure before the initial reloading in accordance with the invention.

FIG. 4b is an illustration of the data structure after the initial reloading in accordance with the invention.

FIGS. 5a and 5b are a flowchart for control by the microprocessor during data reloading with a chip card in accordance with the invention.

DESCRIPTION OF THE PREFERRED EMBODIMENTS

Figure 1A:
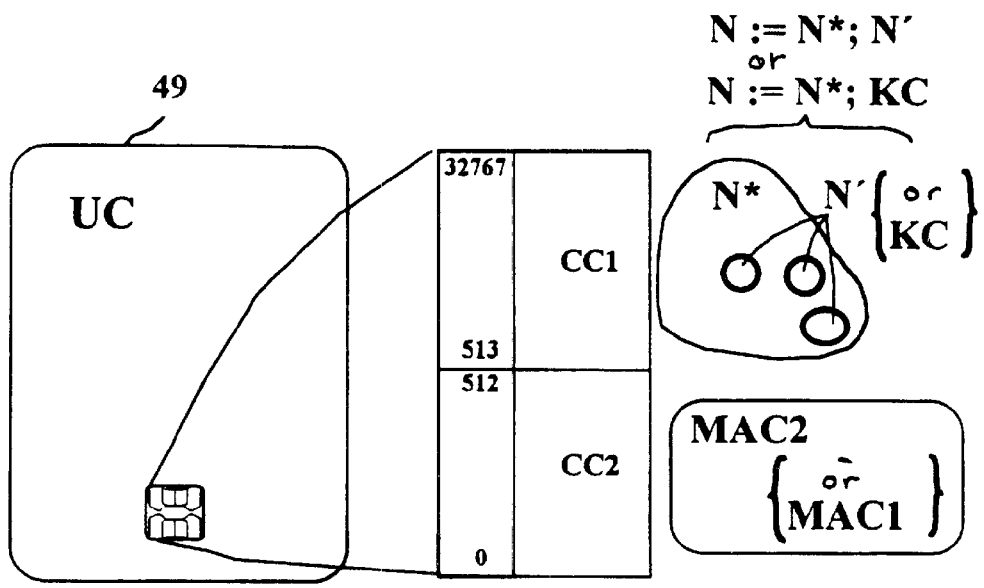
FIG. 1a illustrates details of the memory areas of the unpersonalized chip card in accordance with the invention.

FIG. 1a shows a chip card 49 with a contact field. As is known, the memories are located under the contact field of the chip, the memory areas thereof being divided into unprotected and protected areas. The use data are stored in the unprotected area and a message authentification code MAC is stored in the protected area. This chip card 49 belongs to the type b. Further chip cards that belong to other types are provided for the utilization in the postal apparatus, particularly in a postage meter machine. The postage meter machine is therefore equipped with a corresponding chip card write/read unit for a number of types.

The method for reloading change data into a postage meter machine by chip card begins with an initial insertion of a first chip card 49 into a chip card write/read unit, automatic type recognition and reloading of use data from the first chip card 49 into the postage meter machine. A modification of data from the loaded use data ensues in a predetermined way in the postage meter machine. As a result of the first reloading, data modified in a predetermined way in the postage meter machine are written into the chip card 49. Upon insertion of a second chip card 47 into the chip card write/read unit, a reloading of data from the second chip card 47 into the postage meter machine likewise ensues after automatic type recognition. Data are thereby partially overwritten or deleted. This has the following background: The postal authority can provide the broad spectrum of services itself or commission sub-contractors or private mail carriers to undertake a handling of mail, for example courier mail. The mail pick-up and/or the express delivery thereof is then carried out by the sub-contractor who, consequently, also demands payment according his own fee schedules for this special service. Given reloading of the mail carrier identifier and of the corresponding postage fees of the subcontractor or private mail carrier, the mailings can then continue to be franked with postage meter machines.

For all other mail carrier services, the first chip card 49 contains the postage fees corresponding to the fee schedule of the postal authority and a mail carrier identifier. Upon subsequent, repeated insertion of the first chip card 49, an automatic type recognition and a data loading from the chip card 49 into the postage meter machine ensue. The reloading relates to the charges according to the valid fee schedule for this specific service on the part of the mail carrier and relates to data or the number of the mail carrier identifier. The original data thus can be reconstructed in order to subsequently frank the mail with the postage meter machine with the stamp format and according to the fee schedule of the postal authority as in the beginning. Such mail can continue to be taken to any post office. A subsequent write-in of data modified in a predetermined way in the postage meter machine into the chip card is again provided in this later, repeated insertion, the chip card 49 consequently continuing to supply usable data only for the same postage meter machine.

At least one application of possible operating functions of a postage meter machine is provided for every chip card type, and the microprocessor is programmed to distinguish the application type based on the chip card type.

Figure 1B:
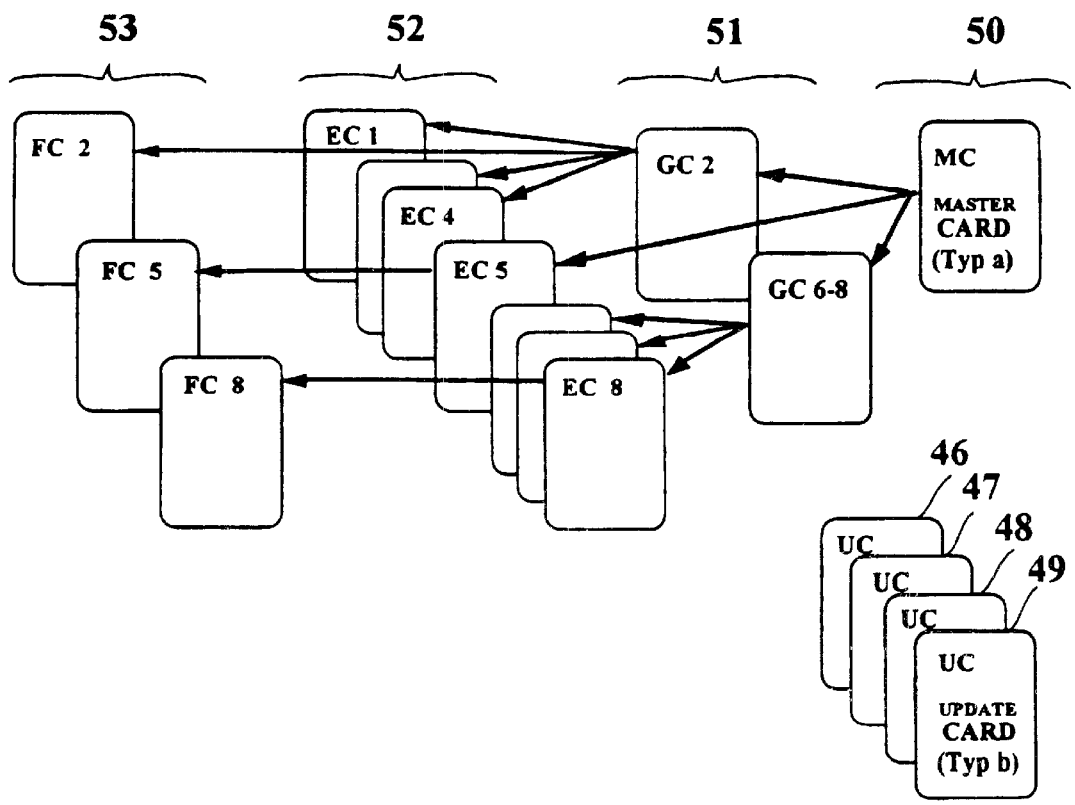
FIG. 1b shows a set of chip cards of a different type used in accordance with the invention.

A hierarchic structure that—as shown in FIG. 1b—can be arbitrarily expanded and modified by the postage meter machine user proceeding from a first chip card exists for a number of type a chip cards. The first chip card 50 is at the highest hierarchy level and is referred to below as the master card. The second chip cards referenced 51 in the group are at the first hierarchy level, the further chip cards referenced 52 in the group are at the second hierarchy level, the following chip cards referenced 53 in the group are at the third hierarchy level, etc. Cards from these groups of chip cards for which the function application authorization is stored tabularly level-by-level, limited in selectable fashion, are also referred to as successor cards. The cards of the lowest hierarchy level are the most limited in function application scope. Each card contains a consecutive number for which function application programs are stored in the postage meter machine, the allocation being freely programmable for (or by) the authorized user. The protection of the cards against readout of the consecutive number is possible in a known way by PIN or other security algorithms. Given loss of the master card, a replacement is only possible via a communication with the postage meter machine manufacturer, with corresponding documentation as to the authenticity being supplied by the requestor. The inhibiting or enabling of all other cards is possible with the master card. A further security factor in the initialization of the system with the assistance of the master card is achieved because only physically present cards can be initialized. As a result, the secret, consecutive numbers of the cards are protected. An inhibit of the corresponding memory area of the postage meter machine can ensue when a successor card is lost.

Type b chip cards serve for reloading table data, particularly fee schedule change data. One chip card 49 can contain the currently valid version and one chip card 48 can contain predetermined change data for a version of a postage fee table valid in the future. The version valid in the future can be required when franking mail for producing pre-dated mail. Subsequently, the change with the chip card 48 can be reversed by loading with the chip card 49. Advantageously, thus, the memory capacity in the postage meter machine for postage fee tables need not be expanded but can remain limited to an optimum size. This is especially advantageous for a multi-carrier postage meter machine that should have the fee schedules of a number of mail carriers available, or take them into consideration. Further chip cards 47 are provided for this purpose with data corresponding to the other fee structure of other mail carriers, etc., for carrier-related reloading of fee schedule change data.

Inventively, the postal apparatus, particularly a postage meter machine, is equipped with a chip card write/read unit 70 for reloading change data by chip card and with a printer 20 that is controlled by a control system 1.

A first chip card 49, inserted into a plug-in slot 72 of the chip card write/read unit 70, allows a reloading of a dataset CK into the postage meter machine for at least one application. The control system 1 includes a control device 90 equipped with memories 92, 93, 94, 95. The program memory 92 contains the operating program and at least security-relevant component parts of the program for the predetermined form change of a part of the use data. The main memory RAM 93 serves for volatile intermediate storage of intermediate results. The clock/data module 95 likewise contains addressable but non-volatile memory areas for intermediate storage of intermediate results or known program parts as well (for example, for the DES algorithm and thus is referred to below as one of the non-volatile memories). It is provided that the control device 90 of the postage meter machine is connected to the chip card write/read unit 70, whereby the microprocessor 91 of the control device 90 is programmed a) to access first and second memory areas C1 and C2 of the non-volatile memories 94, 95 of the control device 90 in which the dataset CK loaded from the chip card and the dataset CK' to be newly loaded into the chip card are stored;

b) to apply a specific calculating operation or mask to the use data N contained in the loaded dataset CK in order to undertake a data removal from the memory area C1 with separation of the predetermined use data N' from the remaining use data N*;

c) to access the memory areas C3 and C4 of the non-volatile memory 94, 95 of the control device in which at least a first key K1 and an encryption algorithm are stored in a manner protected against an unauthorized readout;

d) to encrypt the predetermined use data N' with the first key K1 to form a crypto code KC and to store it in the second memory area C2, and to form the new dataset CK' using the remaining use data N*;

e) to load the new dataset CK' that is formed into the chip card; and f) to load the use data N from the memory area C1 for their application in corresponding memory areas.

The microprocessor is programmed to distinguish the applications based on the chip card type, with at least one application of possible operating functions of a postage meter machine being provided for each chip card type. In an expanded embodiment, the microprocessor is programmed for reloading and modifying data N' from the loaded use data N and for checking the authorization of the use data, with the use data being stored in a first memory area CC1 of the chip card and containing the remaining use data N* and variable data N' or a crypto code KC after the initial use. Also in this expanded embodiment a code MAC2, or another code MAC1, after the initial use is stored in a second memory area CC2 of the chip card for authorization of the use data. To that end, a third key K3 and an encryption algorithm are stored in the memory areas C3 and C4 of the non-volatile memory 94, 95 of the control device 90 in manner protected against unauthorized readout. The crypto code KC is calculated in the postage meter machine and written into the chip card, so that the chip card supplies usable data only for the same postage meter machine.

Figure 2:
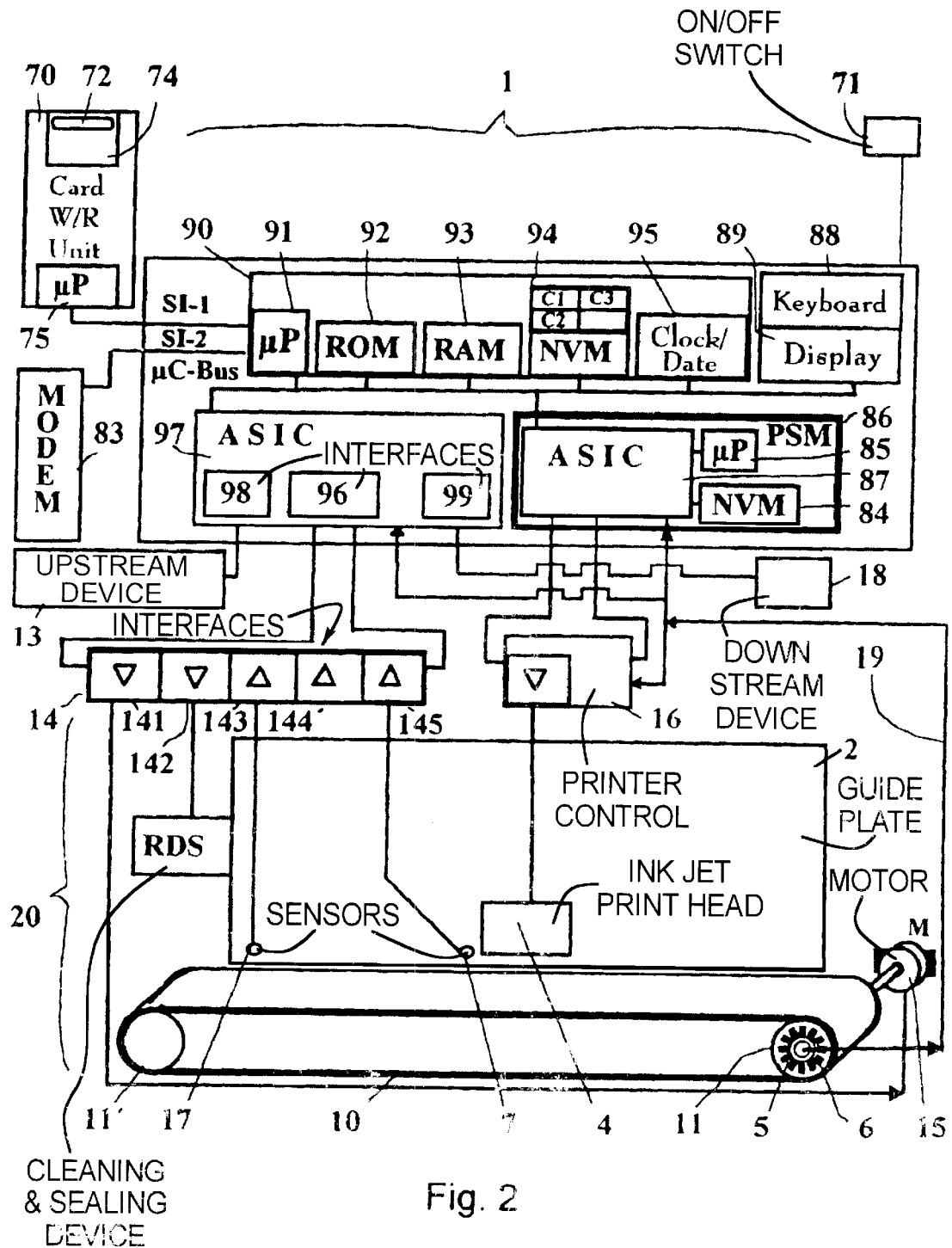
FIG. 2 is a block circuit diagram of a postage meter machine constructed and operating in accordance with the invention.

FIG. 2 shows a block circuit diagram for setting the function of the postage meter machine and for driving the printer 20 with a chip card write/read unit 70 and with a control system 1 of the postage meter machine. The control system 1 forms the actual meter and includes a first control device 90, a keyboard 88 and a display unit 89 as well as a first and a second application-specific circuits (ASIC) 87 and 97. The first control device 90 contains a first microprocessor 91 and known memories 92, 93, 94 as well as a clock/date circuit 95. Areas for storing accounting data that are allocated to the cost centers are provided in the non-volatile memory 94.

Together with a second microprocessor 85 and a non-volatile memory 84, the first ASIC 87 forms a postal security module PSM 86. The postal security module PSM 86 is enclosed in a physically secured housing and has a fast serial interface to the printer control 16. A hardware-based debiting in the first ASIC 87 ensues before every franking imprint. The debiting ensues independently of cost centers. The second microprocessor 85 contains an integrated read-only memory int.ROM (not shown) with the specific application program that is approved for the postage meter machine by the postal authority, or the respective mail carrier. The postal security module PSM 86 can be implemented as disclosed in greater detail in European Application 789 333.

Both ASICs 87 and 97 are connected via the parallel µC bus to at least the control device 90 and the display unit 89. The first microprocessor 91 preferably has terminals for the keyboard 88, a serial interface SI-1 for the connection of the chip card write/read unit 70 and a serial interface SI-2 for the optional connection of a modem. The credit stored in the non-volatile memory 84 of the postal security module PSM 86 can be increased with the modem.

The second ASIC 97 has a serial interface circuit 98 to a preceding device 13 in the mail stream, a serial interface circuit 96 to the printer device 20 and a serial interface circuit 99 to a device 18 following the printer device 20 in the mail stream.

A suitable peripheral device embodying such interfaces is described in German Application 197 11 997.2 (as yet unpublished), corresponding to pending U.S. application Ser. No. 09/041,469 filed Mar. 12, 1998 ("Arrangement for Communication Between Stations of a Mail Processing Machine," Kunde et al.) assigned to the same assignee as the present application.

The interface circuit 96 coupled with the interface circuit 14 located in the machine base produces at least one connection to the sensors 6, 7, 17 and to the actuators, for example to the drive motor 15 for the drum 11 and to a cleaning and sealing station RDS for the ink jet print head 4, as well as to the ink jet print head 4 of the machine base. Further details of the interaction between the print head 4 and the cleaning and sealing station RDS are disclosed in German Application 197 26 642.8 (not yet published, corresponding to pending U.S. application Ser. No. 09/099,473, filed Jun. 18, 1998 ("Device for Positioning an Ink Jet Print Head and a Cleaning and Sealing Device," von Inten et al.) assigned to the same assignee as the present application.

One of the sensors 7, 17 arranged in the guide plate 2 is the sensor 17 and serves the purpose of preparing the print initiation during letter transport. The sensor 7 serves for recognizing the start of the letter for the purpose of print initiation during letter transport. The conveyor arrangement is composed of a conveyor belt 10 and two rollers 11, 11'. One of the rollers is the drive roller 11, connected to the a motor 15, another is the entrained tension roller 11'. The drive roller 11 is preferably a toothed roller; accordingly, the conveyor belt 10 is a toothed belt, assuring a positive force transmission. An encoder is coupled to one of the rollers 11, 11'. The drive roller 11 together with an incremental sensor 5 is preferably firmly seated on a shaft. The incremental sensor 5 is implemented, for example, as a slotted disk that interacts with a light barrier 6, forming the encoder.

The individual print elements of the print head 4 are connected within its housing to print head electronics, and the print head can be driven for a purely electronic printing. The print control ensues on the basis of the path control, with the selected stamp offset being taken into consideration, this being entered by keyboard 88 or, as needed, by a chip card and being non-volatilely stored in the memory NVM 94. A planned imprint thus derives from the stamp offset (without printing), the franking imprint image and, possibly, further print images for advertizing slogan, dispatching information (selective imprints) and additional, editable messages.

The chip card write/read unit 70 is composed of a mechanical carrier for the microprocessor card and a contacting arrangement 74. The latter allows a reliable mechanical holding of the chip card in the read position and unambiguous signaling of when the read position of the chip card in the contacting arrangement 74 is reached, for example a tactile signal by a pressure point according to the push/push principle, an eject key or a display beeper message of the postage meter machine. A reliable electrical contacting of chip cards with contacts according to ISO 7816 for at least 100,000 contacting cycles, as well as easy utilization when plugging and pulling the chip card are thus achieved. The microprocessor card with the microprocessor 75 has a programmed-in read capability for all types of memory cards, as well as for chip cards with and without PIN coding. An encryption or deciphering for security algorithms (for example, RSA, DES) is not required. The interface to the postage meter machine is a serial interface according to RS232 standard. The data transmission rate amounts to a minimum of 1.2 Baud. A self-test function with ready message can be manually implemented or can be automatically implemented after turning on the power supply with switch 71.

Figure 3:
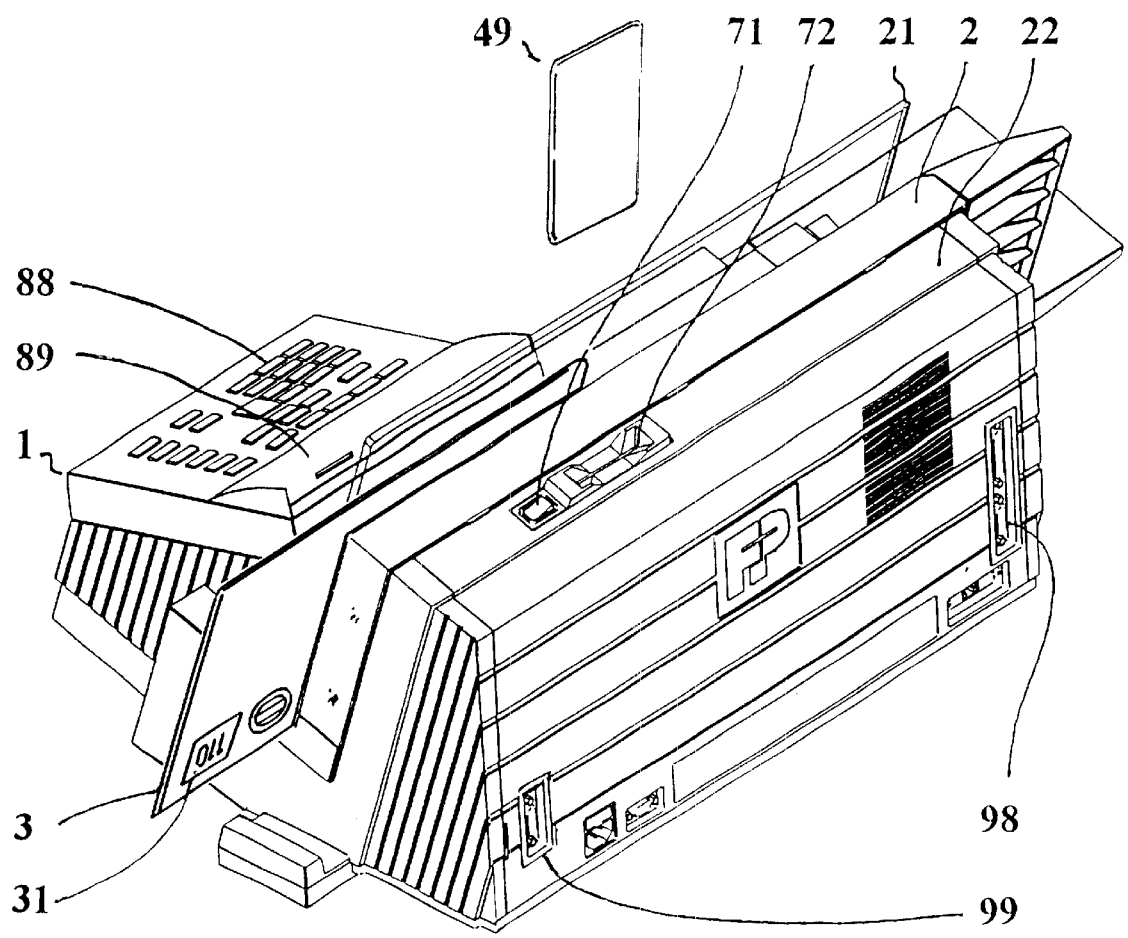
FIG. 3 is a perspective view of a postage meter machine from behind in accordance with the invention.

FIG. 3 shows a perspective view of the postage meter machine from behind. The postage meter machine is equipped with a chip card write/read unit 70 that is arranged behind the guide plate 2 and is accessible from the upper housing edge 22. After the postage meter machine is turned on with the switch 71, a chip card 50 is plugged from top to bottom into the insertion slot 72 and can be programmed by the user for specific applications. Within the limits prescribed by the manufacturers, this ensues with the user interface 88, 89 of the control system 1 of the meter. The successor cards are configured by the user for predetermined function applications for the respective postage meter machine. The peripheral devices of the postage meter machine can be electrically connected to the interfaces 98 and 99 and thus can be driven by the meter according to the chip card input. A letter 3 supplied standing on edge that has its surface to be printed lying against the guide plate is then printed with a franking stamp 31 according to the input data. The letter delivery opening is laterally limited by a transparent plate 21 and the guide plate 2.

A predetermined cost center is set with the insertion of a first chip card 50 that was supplied together with the postage meter machine. For example, the cost center 1 is pre-set, the accounting ensuing with respect thereto in order to gain access to other cost centers when no other predetermined inputs are actuated by keyboard.

The postage meter machine contains a corresponding application program in its program memory 92, so that a first chip card 50 plugged into the chip card write/read unit 70 allows a setting of the postage meter machine for at least one function application on the highest hierarchy level. Such a type a chip card having only a small memory capacity is inexpensive. According to ISO 7816, a memory card having 256 bytes such as, for example, OMC240SF of the Orga Company can be used.

Another chip card having significant memory capacity is referred to below as type b. For example, an I$^2$CBus memory card having 32 Kbytes according to ISO 7816, particularly AM2C256 of the AMMI company, can be employed. This contains a chip AT24C256 of the Atmel company.

Further chip cards are referred to below as type n. For example, a chip card with 8 Kbytes and having a microprocessor can be employed. The further chip cards of the types b through n relate, for example, to the following function applications:

reload possibility of the postage fee tables via chip card 49, slogan reloading via chip cards (daily stamp), chip cards with limited function application, chip cards with PIN authorization of functions, chip cards for setting peripheral device function, chip cards for setting system configuration, chip cards for the activation of programmed print formats.

FIG. 4a is an illustration of the data structure in the status A of the data storing in the memory areas CC1 and CC2 of the chip card before the initial reloading. The use data N stored in the unprotected area preferably relate to a fee schedule table. A part of the use data always remains unencrypted. These data are referred to below as remaining use data N*. Another part N' of the use data is unencrypted only before the initial reloading. This part is subsequently replaced, for example, by encoded data or by a crypto code KC, so that a status B according to FIG. 4b derives in view of the data structure. The data in the memory area CC1 of the chip card are thereby modified in a predetermined way by writing a new dataset CK' into the chip card. The new dataset CK' now includes a crypto code KC in the memory area CC1 of the chip card. At every repeated data loading, thus, the chip card only supplies usable data when it is inserted into the write/read unit of the same postage meter machine.

A message authentification code MAC2 is stored in the protected memory area CC2 of the chip card and contains a data part encrypted with a second key K2. The latter includes the CRC checksum of selected use data N' and the code of the second key K2, whereby CRC checksum of the selected use data N' and the message authentification code MAC2 are operated in a predetermined way with a suitable calculating operation that is symbolized by the semicolon. The data from the chip card memory areas CC1 and CC2 of the chip card 49 inserted into the plug-in slot 72 that are compiled into a dataset CK are loaded and processed, this being explained in greater detail with reference to FIGS. 5a and 5b.

The status B of the data storing of a new dataset CK' in the chip card shown in FIG. 4b relates to a data structure newly loaded into the chip card after the initial reloading, this being stored in the previous chip card memory areas CC1, CC2. The remaining use data N* that are stored in the first area CC1 preferably relate to parts of a fee schedule table. Data parts which are inserted scrambled are added thereto. In the scrambling, the data parts encrypted with a first key K1 to form a crypto code KC are hidden between the remaining use data. They are thus-distributed on the chip card memory area CC1. A new message authentification code MAC1 is stored in the protected are CC2. This is formed by encryption of the previously stored message authentification code MAC2. The encryption ensues with the first key K1 in the postage meter machine before the loading and storage in the chip card.

FIG. 5a shows a portion of a flowchart for control by the microprocessor of the postage meter machine in the data reloading with a chip card.

After a power supply (not shown) of the postage meter machine is turned on with the switch 71, which is registered by the microprocessor 91 of the postage meter machine in the step 100, a microprocessor 75 connected to a contacting arrangement 74 of the chip card write/read unit 70 signals the microprocessor 91 of the postage meter machine when a chip card is inserted into the plug-in slot 72, which is registered by the microprocessor 91 of the postage meter machine in the step 101. A communication according to a predetermined protocol between the chip card write/read unit 70 and the chip card and an evaluation in step 102 then ensues as to determine whether the chip card is readable as type a. When this is the case, a branch is made from the inquiry step 103 to a step 111 in order to load a part I of the identifier string into the non-volatile memory 94 of the postage meter machine, with an evaluation of the company identification number (company ID) being undertaken by the microprocessor 91 of the postage meter machine. If, however, the chip card is not readable as type a, a branch is made from the inquiry step 103 to a step 104 in order to undertake a communication according to a second predetermined protocol and an evaluation in step 104 as to whether the chip card is readable as type b. When the chip card is readable as type b, a branch is made from the inquiry step 105 to a step 106 for further data processing with the microprocessor 91 of the postage meter machine. In a comparable way as warranted, further protocols are executed (steps 107, not shown in detail) to determine in the inquiry step 108 whether the chip card is readable as type n, in order to then branch to a corresponding step 109 for further data processing by the microprocessor 91 of the postage meter machine. Otherwise, when the type of the chip card is not recognized, a branch back to the step 101 ensues after an error message in the step 110.

A better adaptation to the respective application results compared to prior art techniques. By contrast, the solution according to U.S. Pat. No. 5,606,508 (German OS 42 13 278) or U.S. Pat. No. 5,490,077 does not accommodate cards of different types, i.e. the chip cards are all technologically and functionally the same and a time window for the insertion of a chip card is an invariable, fixed time period. In U.S. Pat. Nos. 5,606,508 and 5,490,077 (in the latter, the sequence is fixed and a chip card A for loading postage fee tables must be plugged in before a chip card B that, for example, sets a cost center), the inventive sequence for the sequential plugging of a series of chips cards internally initialized in the postage meter machine is arbitrary.

The inventive flowchart according to FIG. 5a thus allows the postage meter machine to make a distinction according to different chip card types. An expensive chip card type thus has to be utilized only in those instances where there is no alternative. Advantageously, a suitable chip card type is selected according to the type of application.

When the data processing by the microprocessor 91 of the postage meter machine is implemented in a manner predetermined by the chip card type, monitorings are undertaken according to specific criteria and any errors are displayed (steps 122–124, 128–130, 154) before further use of the postage meter machine is suppressed (step 131).

A type b chip card is utilized when a branch is made from the inquiry step 105 to a step 106. This is provided in order to load the dataset CK stored in the chip card 49 into a first memory area C1 of the non-volatile memory 94 of the postage meter machine. The dataset CK can be represented as follows:

$$CK := N; MAC2 \qquad (1)$$

The unencrypted part of the dataset CK contains the new use data N to be loaded. The encrypted part of the dataset CK is a message authentification code MAC2 that is likewise loaded into the postage meter machine. The semicolon between the two in the above Equation (1) corresponds to a specific operation. Only in the simplest case are the two parts appended to one another. For example, a postage meter machine that is surrounded by a protective housing has a third code K3 stored in the memory area C3 of the non-volatile memory 94, this third code K3 being capable of deciphering the message authentification code. The encryption algorithm can be stored in a further memory area C4 of the non-volatile memory 94 of the protected postage meter machine. The third key K3 and the encryption algorithm can be stored protected against unauthorized reading. The microprocessor 91 is preferably an OTP (one-time programmable) type.

In an especially secure embodiment, the first and third keys K1, K3 and the encryption algorithm are stored in the non-volatile memory 84 of the postal security module PSM 86. The required computational operations such as encryption and deciphering are undertaken by the microprocessor 85 in the postal security module PSM. This can likewise be an OTP (one-time programmable) type. The algorithm and the keys can be stored read-protected in the internal OTP read-only memory.

Figure 5B:
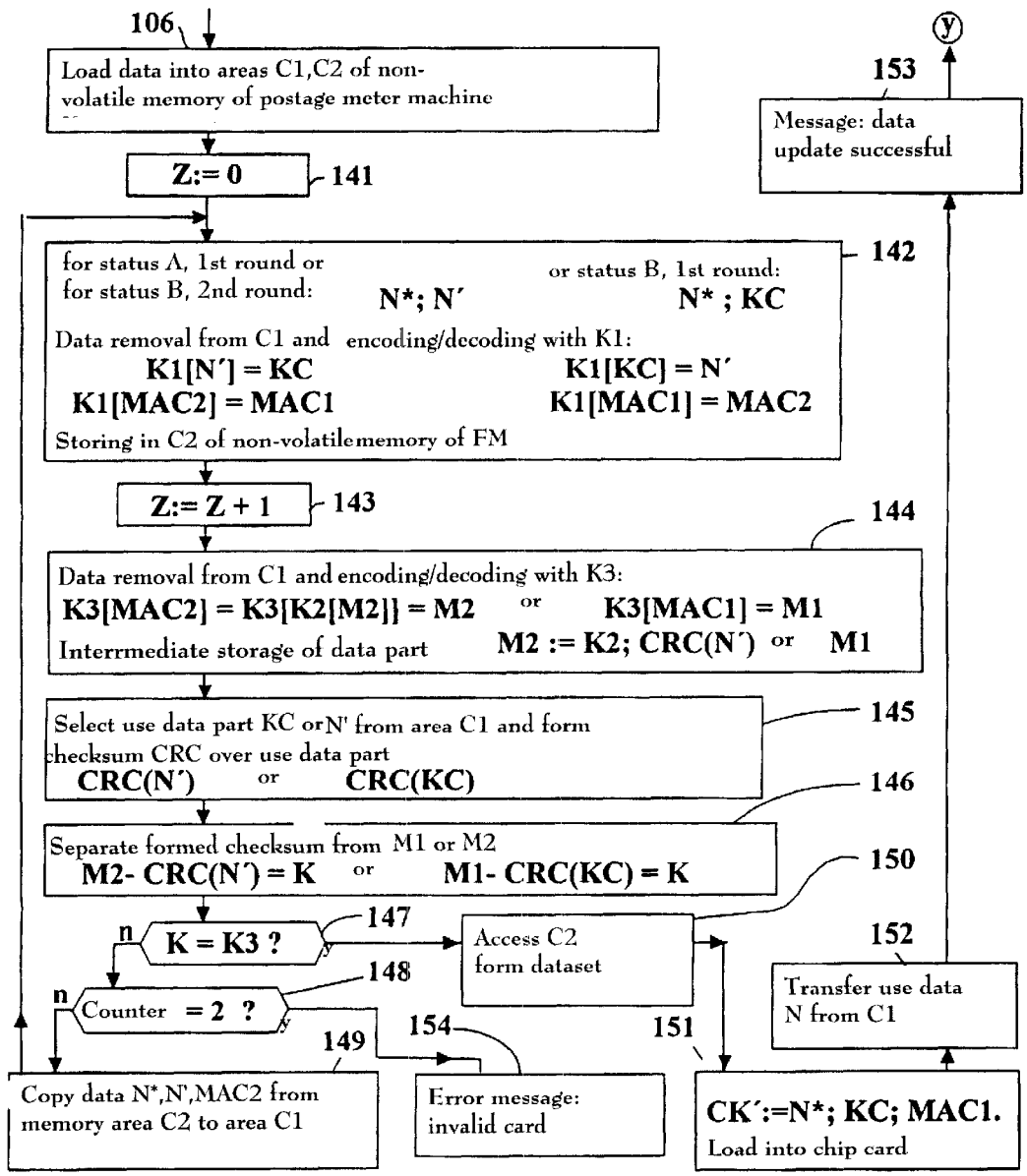

The further executive sequence is shown in FIG. 5b. In a first step 141, a counter is reset Z:=0. The counter is a separate circular counter module or is realized in memory cells of, preferably, the clock/date module 95, whereby the memory cells are correspondingly logically operated with one another and are programmable.

In the second step 142, the use data N are taken from the first memory area CC1 and an encrypted dataset part is taken from the second memory area CC2 of the chip card memory. A corresponding program in the read-only memory 92 controls the data loading. and the following, further computational operations. The status A of the storing of data in a chip card is only present before the first reloading of data into the postage meter machine. The use data include remaining use data N* and specific use data N' according to Equation (2):

$$N:=N^*;N' \quad (2)$$

The specific use data N' selected by the microprocessor according to the program are encrypted (3) with a first key K1 to form the crypto code KC:

$$K1[N']=KC \quad (3)$$

The encrypted dataset part MAC2 is preferably a data part M2 encrypted with a second key K2 and is written as in (4):

$$MAC2:=K2[M2]=K2[K2; CRC(N')] \quad (4)$$

The encrypted dataset part MAC2 is likewise encrypted (5) with the first key K1 to form a MAC1:

$$K1[MAC2]=MAC1 \quad (5)$$

In the second step 142, finally, the use data N and dataset parts encrypted according to Equation (4) and (5) are copied from the memory area C1 into a memory area C2 of the non-volatile memory 94.

In the third step 143, the counter reading of the round counter is incremented to Z:=Z+1.

In the fourth step 144, a decryption attempt is undertaken with the third key K3 stored in the postage meter machine in the framework of a reversible encryption process. To that end, the dataset part MAC2 is taken from the memory area C1, this having been previously loaded from the second chip card memory area. According to status A, this dataset part MAC2 is encrypted with the second key K2. With a reversible, third key K3, the encrypted dataset part MAC2 can be deciphered into the deciphered data part M2. The decrypted dataset part is intermediately stored in the main memory RAM. Given a reversible encryption algorithm, the second key K2 can be identical to the third key K3. Preferably, a secret intermediate result is intermediately stored read-protected in the internal OTP main memory RAM. Thus, $$M2:=K2;CRC(N') \quad (6)$$

arises (3) for the decrypted data part M2. The latter includes the CRC checksum of specifically selected use data N' and the code of the second key K2. The semicolon between the two stands for a specific calculating operation for the operation of the two. The microprocessor 91 or 85 is programmed for the implementation of this calculating operation and for the implementation of a corresponding inverse calculating operation.

The unencrypted part of the stored dataset CK in the memory area C1 of the non-volatile memory 94 of the postage meter machine is accessed in the fifth step 145. Predetermined, specific. use data N' are thereby selected with a mask or with the corresponding calculating rule and the selected use data N' are subsequently processed to a CRC checksum.

In the sixth step 146, the checksum CRC(N') is then separated from the data part M2 with the corresponding inverse calculating operation. For example, the calculated checksum CRC(N') can be subtracted from the data part M2 for the separating when the second key K2 and the original checksum CRC(N') were additively operated (7) in the data part M2:

$$M2-CRC(N')=K\ \{K2+CRC(N')\}-CRC(N')=K \quad (7)$$

In the seventh step 147, the remainder K is compared to the third key K3 stored internally in the postage meter machine. It can thereby be determined whether the two keys have a predetermined relationship to one another. A check for equality (8) is only carried out in the simplest case:

$$K3=K\ ? \quad (8)$$

When a predetermined relationship is found, i.e. the remainder in the above case is identical to the second key K2 and equal to the key K3 stored internally in the postage meter machine, a branch is made via step 150 to the step 151 in order to form a new dataset CK'. A chip card with data in status A (FIG. 4a) was thus already capable of being recognized in the seventh step 147 in the first loop.

Otherwise, a check is carried out in the eighth step 148 to determine whether the counter reading of the counter has already reached the value two. This is not yet the case in the first loop. In order to conduct a second loop, a branch is made back to the aforementioned second step 142 via a ninth step 149 in which the memory content of the memory area C1 is changed. As a result of the change of the memory content, a data status is reached in the memory area C1 as though a data structure according to the status A—shown in FIG. 4a—had existed in the data storage and, thus, as though the first loop were about to begin.

If, however, a predetermined relationship for a valid chip card inserted for the first time is already found in the first loop, then the second internal memory area C2 is accessed in the step 150 in order to form the new dataset CK'.

$$CK':=N^*;KC; MAC1 \quad (9)$$

is valid (9) for the new dataset CK'.

This dataset CK' then can be loaded into the chip card in the step 151, i.e. can be non-volatilely stored in the internal chip card memory and, at the same time, represents the status B according to FIG. 4b. In the step 152, the use data N from the first internal memory area C1 are transferred into the main memory corresponding to the respective application or are transferred into another non-volatile memory of the postage meter machine. Subsequently, the message indicating the successful updating is produced in the step 153, for example in the form of a display or signaled by a beeper.

The status B shown in FIG. 4b is present in every further reloading.

The unencrypted part of the dataset CK' contains remaining use data $N^*$, i.e. the new use data N without the predetermined use data N'. The remaining use data $N^*$ are supplemented by encrypted use data of the crypto code KC and are then stored together in the memory area CC1 of the chip card 49. The encrypted use data of the crypto code KC are inserted scrambled in a specific way into the remaining use data. A specific calculating operation or mask is employed therefor. The specific calculating operation is again symbolized by a semicolon in the new dataset CK' and, for example, is implemented such that a scrambled data part arises. The remaining use data $N^*$ in the new dataset CK' are in fact necessary but not adequate for a franking according to valid postage fee schedules.

At the next insertion of the card, a scrambled data part thus must be unscrambled in order to obtain the crypto code KC. The unencrypted, predetermined use data can then be recovered from the latter by decryption. The predetermined use data N' recovered by decryption of the crypto code KC using the first key K1 can now be stored in the postage meter machine and correspondingly employed.

The encrypted part of the new dataset CK' contains. a further message authentification code MAC1. The latter is stored in the memory area CC2 after the first use of the card. In conjunction with the reading of the circular counter and with the authenticity check, the chip card can also be checked with this message authentification code for a presence of the status A or B.

Given an inserted chip card with a dataset according to status B, the following calculating operations are implemented in the first pass. In the second step 142:

$$K1[KC]=N' \quad (10)$$

$$K1[MAC1]=MAC2 \quad (11)$$

with storage in the memory area C2. After the incrementation of the circular counter in the third step 144, the following calculating operations are implemented; in the fourth step 144:

$$K3[MAC1]=M1 \quad (12)$$

In the fifth and sixth step 145 and 146:

$$M1-CRC(CK)=K \quad (13)$$

Since no predetermined relationship to K3 was determined in the seventh step 147, the data $N^*$, N', MAC2 stored in the memory area C2 are copied into the memory area C1 in the ninth step for a second loop. For the second loop, thus, data equivalent to status A are present, and the following calculating operations are implemented. In the second step 142:

$$K1[N']=KC \quad (14)$$

$$K1[MAC2]=MAC1 \quad (15)$$

with storage in the memory area C2. Deriving in the fourth step due to Equation (6) and K3 reversible to K2 is:

$$K3[MAC2]=M2 \quad (16)$$

In the fifth and sixth step 145 and 146:

$$M2-CRC(N')=K \quad (17).$$

In the seventh step 147, a predetermined relationship of the value k to K3 is then found. In a simplified embodiment, the equality of the keys K2=K3 is provided; K=K2=K3 then applies. The authenticity can thus only be checked in the second round after a conversion of the MAC1 into a MAC2 that ensued in the first round. If the authenticity is not found even after running the second loop, i.e. in the seventh step 147 again, and the circular counter has reached a counter reading=2, then the chip card is declared invalid, and an error message, "invalid card", ensues in the step 154. Thus the authenticity or non-authenticity of the use data can be ultimately determined after running two loops. Given a status B in the chip card, thus, the second loop is required in order to be able to form, first, the code MAC1 in the step 142 and then to form the new dataset CK' in the step 150, in order to be able to load the latter into the chip card in the step 151, as well as to use the predetermined use data N' decrypted from the crypto code KC in the first round in the step 142 and stored in the first memory area C1 in the step 149, namely to use the use data N' in conjunction with the remaining use data $N^*$ (step 152). In a further embodiment, the data of the dataset CK' can differ from one another dependent on the number of uses when an altered code is used for the first key. Further steps that attempt a decryption of the crypto code, or authentification with the assistance of a different code, are then implemented before an error message in the step 154.

The non-volatilely stored use data of the postage meter machine can be updated with the new use data N of the chip card 49. After their transfer from the memory area C1 in the step 152, the latter can be stored in at least one of the further memory areas Cn of the non-volatile memory 94 of the postage meter machine and be present there for further processing. The stamp image can thereby be modified carrier-specific with that part of the loaded use data N identifying the mail carrier, and the postage fee tables can be entirely or partly updated with the fee schedule part of the loaded use data N.

The non-volatilely stored use data of a scale can likewise be updated with the fee schedule part of the new use data n of the chip card 47, 48 or 49 under the guidance of the control system of the postage meter machine, as was fundamentally disclosed in European Application 724 141 (corresponding to U.S. Pat. No. 5,710,706). The device 13 (FIG. 2) preceding the postage meter machine in the mail stream is a postage-calculating scale in this case. The latter contains an integrated postage computer with non-volatile memories for updatable storing of multi-carrier postage fee tables. The updating is then a component of the step 152 for transfer of the use data that is shown in FIG. 5b. The microprocessor is programmed to load the fee schedule part of the use data N from the memory area C1 for their application in corresponding memory areas of a postage-calculating scale 13.

A postal apparatus—similar to that shown in FIG. 2—is equipped at least with a control system 1, a chip card write/read unit 70 and a postal security module 86. Preferably, a computer which is upgradable with corresponding inserts can be re-equipped into the postal apparatus. The printing then ensues with a commercially available printer.

An alternative embodiment can include a computer upgraded in the aforementioned way and a connected, specific franking printer. The aforementioned German application 197 11 997.2, corresponding to U.S. application Ser. No. 09/041,469 discloses a suitable embodiment. The personal computer would only have to be equipped with chip card write/read unit 70 and a corresponding application program. For example, the insert for the modem could be used for this purpose.

The postal apparatus is equipped with a chip card write/read unit 70 for reloading change data by chip card and with a control system 1 to which a printer 20 that is controlled by the control system 1 is connected. The first chip card 49 inserted into a plug-in slot 72 of the chip card write/read unit 70 allows a reloading of a dataset CK into the postal apparatus for at least one application. The control system 1 includes a microprocessor 91 with appertaining memories 92, 93, 94, 95. The control system 1 of the postal apparatus is connected to the chip card writer/read unit 70 and to a postal security module 86, the postal security modules 86 containing an application-specific circuit ASIC 87, a non-volatile memory 84 and a microprocessor 85. The microprocessor 85 of the postal security module 86 is programmed a) to access first and second memory areas C1 and C2 of the non-volatile memory 84 of the postal security module 86 in which the dataset CK loaded from the chip card and the dataset CK' to be newly loaded into the chip card are stored;

b) to apply a specific calculating operation or mask to the use data N contained in the loaded dataset CK in order to undertake a data removal from the memory area C1 with separation of the predetermined use data N' from the remaining use data N*;

c) to access the memory areas C3 and C4 of the non-volatile memory 84 of the postal security module 86 in which a first key K1 and third key K3 and an encryption algorithm are stored protected against an unauthorized readout;

d) to encrypt the predetermined use data N' with the first key K1 to form a crypto code KC and store it in the second memory area C2 and to form the new dataset CK' using the remaining use data N*;

e) to load the new dataset CK' that has been formed into the chip card; as well as f) to load the use data N from the memory area C1 for their application into corresponding memory areas.

The control system 1 of the postal apparatus is, for example, the control system of a postage meter machine or a computer that is correspondingly re-configured and connected to a postage meter machine. For this reconfiguration the control system 1 of the postal apparatus is connected to the chip card write/read unit 70 and to the postal security module 86, whereby the postal security module 86 includes an application-specific circuit ASIC 87, a non-volatile memory 84. and a microprocessor 85. The microprocessor 85 of the postal security module 86 is programmed to access first and second memory areas C1 and C2 of the non-volatile memory 84 of the postal security module 86 in which the data set CK loaded from the chip card and the dataset CK' to be newly loaded into the chip card is stored.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for reloading change data into a postal apparatus, said method comprising the steps of:

providing a non-volatile memory in a postal apparatus;

providing a chip card write/read unit at said postal apparatus in communication with said non-volatile memory;

storing use data in a first chip card of a first chip card type;

inserting said first chip card a first time into said chip card write/read unit, recognizing said first chip card type in said postal apparatus and loading said use data from said first chip card into said non-volatile memory and storing said use data in said non-volatile memory;

recognizing in said postal apparatus the first time insertion of said first chip card and producing modified data in said postal apparatus including said use data and an encrypted crypto code which identifies said first time insertion of said first chip card;

writing said modified data in said first chip card in said chip card write/read unit to uniquely personalize said first chip card for use only with said postal apparatus;

supplying an unpersonalized second chip card of a second chip card type having change data stored therein for changing said use data;

after removing said first chip card from said chip card write/read unit, inserting said second chip card in said write/read unit and recognizing said second chip card type in said postal apparatus and loading said change data into said non-volatile memory in place of said use data and storing said change data in said non-volatile memory; and after removing said second chip card from said chip card write/read unit, re-inserting said first chip card in said chip card write/read unit, decrypting said crypto code in said postal apparatus to obtain decrypted information and analyzing said decrypted information in said postal apparatus to determine whether the re-inserted first chip card is uniquely personalized for said postal apparatus, and upon recognition of said re-inserted first chip card as being personalized for said postal apparatus, reloading said use data from said first chip card into said non-volatile memory.

2. A method as claimed in claim 1 comprising the additional step of, after reloading said use data from said re-inserted first chip card into said non-volatile memory, generating further modified data, including a further encrypted crypto code identifying the re-insertion of said first chip card, and writing said further modified data in said re-inserted first chip card in said chip card write/read unit.

3. A method as claimed in claim 2 comprising the steps of re-inserting and removing said first chip card in said chip card write/read unit a plurality of times and, upon each repeated insertion of said first chip card in said chip card write/read unit, producing said further modified data including an encrypted crypto code identifying a number of times said first chip card has been inserted in said chip card write/read unit.

4. A method as claimed in claim 1 wherein the step of storing change data for changing said use data in an unpersonalized second chip card of a second chip card type comprises providing a chip card having only a memory as said second chip card of said second chip card type.

5. A postal apparatus comprising:

a printer which prints a postal imprint on a print-receiving medium;

control means, connected to said printer, for controlling a procedure resulting in the printing of said imprint by said printer, said control means including a microprocessor non-volatile memory having a first memory area, a second memory area, a third memory area in which a first crypto key is stored and a fourth memory area in which an encryption algorithm is stored, said third and fourth memory areas being protected against unauthorized readout;

a chip card write/read unit connected to said control means;

a chip card removably insertable into said chip card write/read unit, said chip card having a dataset stored therein including use data; and said control means, upon insertion of said chip card in said chip card write/read unit, accessing said first memory area and said second memory area of said non-volatile memory and loading said dataset from said chip card into said first memory area for storage in said first memory area, applying a predetermined operation on said use data in the dataset loaded into said first memory area to remove predetermined use data from said use data, and leaving remaining use data, accessing said third memory area and said fourth memory area of said non-volatile memory to retrieve said first key and said encryption algorithm, encrypting said predetermined use data using said first key and said encryption algorithm to form a crypto code and storing said crypto code in said second memory area of said non-volatile memory to form a new dataset including said remaining use data, loading said new dataset from said second memory area into said chip card inserted in said chip card write/read unit, for uniquely personalizing said chip card for use only with one postal apparatus and loading said use data from said first memory area and employing said use data from conducting said procedure resulting in printing of said imprint.

6. A postal apparatus as claimed in claim 5 further comprising a postal security module and a postage meter machine containing said printer, said chip card write/read unit and said postal security module, wherein said control means comprises a control unit contained in said postage meter machine, connected to said chip card write/read unit and to said postal security module, and wherein said postal security module comprises an application-specific integrated circuit, a postal security module non-volatile memory containing said first memory area and said second memory area.

7. A postal apparatus as claimed in claim 5 wherein said chip card comprises a first chip card of a first chip card type, said apparatus further comprising at least one second chip card of a second chip card type, wherein said control means comprises means for distinguishing between said first and second chip card types and comprising means for executing at least one function, as part of said procedure resulting in the printing of said imprint, dependent on the chip card type, and said control means comprising means for checking said use data to determine whether said use data is authorized dependent on said crypto code stored in said second memory area, means for writing said crypto code stored in said second memory area into said first chip card when said first chip card is inserted in said chip card write/read unit after said use data has been loaded from said first-chip card into said first memory area for uniquely personalizing said first chip card for use only with one postal apparatus.

8. A postal apparatus as claimed in claim 5 wherein said use data include a postage fee schedule, and wherein said postal apparatus further comprises a scale connected to said control means, said scale including a scale memory and a postage-calculating unit connected to said scale memory, and wherein said control means comprises means for loading said fee schedule into said scale memory for use by said postage-calculating unit.

9. A postal apparatus comprising:

a postal security module formed by an application specific integrated circuit containing a first memory area and a second memory area;

a printer which prints a postal imprint on a print-receiving medium;

a chip card/read unit;

a chip card removable insertable into said chip card write/read unit, said chip card having a data set stored thereon including use data;

said postal security module, said printer and said chip card write/read unit being contained in a postage meter machine; and a computer separate from said postage meter machine, connected to said printer, said chip card write/read unit and said postal security module, for controlling a procedure resulting in the printing of said imprint by said printer, said computer including a microprocessor and a non-volatile memory having a third memory area, in which a first crypto key is stored and a fourth memory area in which an encryption algorithm is stored, said third and fourth memory areas being protected against unauthorized readout, said computer, upon insertion of said chip card in said chip card write/read unit, accessing said first memory area and said second memory area of said postal security module and loading said dataset from said chip card into said first memory area for storage in said first memory area, applying a predetermined operation on said use data in the dataset loaded into said first memory area to remove predetermined use data from said use data, and leaving remaining use data, accessing said third memory area and said fourth memory area of said non-volatile memory to retrieve said first key and said encryption algorithm, encrypting said predetermined use data using said first key and said encryption algorithm to form a crypto code and storing said crypto code in said second memory area of said postal security module to form a new dataset including said remaining use data, loading said new dataset from said second memory area into said chip card inserted in said chip card write/read unit, and loading said use data from said first memory area of said postal security module and employing said use data from conducting said procedure resulting in printing of said imprint.

* * * * *